United States Patent
Itoh et al.

(10) Patent No.: US 6,906,791 B2
(45) Date of Patent: Jun. 14, 2005

(54) IMAGE RECORDING APPARATUS

(75) Inventors: Satoru Itoh, Kanagawa (JP); Nobuyuki Torisawa, Minami Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/692,674

(22) Filed: Oct. 27, 2003

(65) Prior Publication Data

US 2004/0135978 A1 Jul. 15, 2004

(30) Foreign Application Priority Data

Oct. 30, 2002 (JP) .................................... P2002-316353

(51) Int. Cl.⁷ ........................ G03B 27/00; G03B 27/32; G03B 27/52
(52) U.S. Cl. ............................ 355/405; 355/27; 355/40
(58) Field of Search ............................ 355/27, 40, 405; 347/228

(56) References Cited

U.S. PATENT DOCUMENTS 5,146,087 A * 9/1992 VanDusen ...................... 399/2
5,975,772 A * 11/1999 Imai et al. ................... 396/575
6,499,893 B2 * 12/2002 Harada et al. .............. 396/575
2002/0001028 A1 * 1/2002 Mori et al. .................. 347/228

FOREIGN PATENT DOCUMENTS

JP 2000-321748 A 11/2000

* cited by examiner

Primary Examiner—Henry Hung Nguyen
(74) Attorney, Agent, or Firm—Sughrue Mion, PLLC

(57) ABSTRACT

Mounting trays for storing therein sheet-shaped recording materials are used to record thereon images. A laser exposing unit forms a latent image of an image on the recording material in an exposure process by irradiating laser. A heat development unit performs a heat development process for the recording material on which the latent image has been formed. The mounting trays the laser exposing unit and the heat development unit are disposed along upper/lower directions of an image recording apparatus in this order of image processing operations for the recording material. A length of a transport path for a recording material is short within this image recording apparatus to shorten processing time.

8 Claims, 2 Drawing Sheets

IMAGE RECORDING APPARATUS

BACKGROUND OF THE INVENTION

1. Field of the Invention

The present invention relates to an image recording apparatus for performing both an exposure process by the laser irradiation and a heat development process by the application of heat on a heat development/photosensitive material or a photosensitive/thermal recording material which was drawn out from a mounting tray, to obtain a recording material on which an image has been formed. More specifically, the present invention is related to an image recording apparatus in which a transport path length of a recording material is short to shorten process time.

2. Description of the Related Art

Recently, it is strongly demanded to reduce liquid wastes in the medical field in view of the environmental conservation and the saving space. Therefore, a technique of related to photosensitive/heat-developing photographic materials for medical diagnosis and photograph, which enables to effectively expose with a laser image setter or a laser imager and enables to form clear black-colored images having high resolution and sharpness. A heat development process system is provided by using the photosensitive/heat development photographic materials. Since the heat development process system does not use chemical liquid products, the environmental pollution is eliminated. Further, it is simple for customers.

The same is required in the field of the general image forming materials. For example, since fine drawing is required for medical images, high image qualities having good sharpness and granularity is necessary for the medical images. Furthermore, it tends to be preferred cold black-tone images in view of diagnostic aspects. Although ink jet type printers and various sorts of hard copy systems utilizing pigment and dye for electro-photograph at present, there is no printer which satisfy necessary requirements as medical image output systems.

In contrast to the above-described hard copy systems, recently, a attention is paid to an image recording apparatus using dry systems without wet type process which enables to solve a problem related to process of liquid waste.

FIG. 2 shows an arrangement of a conventional image recording apparatus with the dry system.

This conventional image recording apparatus 1 mounting trays 5 and 6, a laser exposing unit 11, a heat development unit 15, and a transporting mechanism 17. The image recording apparatus 1 records an image on a recording material 3. The mounting trays 5 and 6 store therein sheet-shaped recording materials 3 for recording thereon images, and are made of a heat (thermal) developing/photosensitive material having a photosensitive characteristic and a thermo-sensitive characteristic. The laser exposing unit 11 forms a latent image of an image on a recording material 3 by irradiating thereon a laser by a laser exposing unit 9. The heat development unit 15 performs a heat development process with respect to the exposure-processed recording material 3 by applying heat by a heating means 13. The transporting mechanism 17 transports the recording materials 3 drawn out from the mounting trays 5 and 6 via the laser exposing unit 11 to the heat development unit 15.

JP-A-2000-321748 is known as a prior art.

In the image forming apparatus 1, a supporting mechanism 21 for supporting the recording material 3 when the laser is irradiated in the laser exposing unit 11 has one pair of rollers 23 and 24. The paired rollers 23 and 24 sandwich the recording material 3 at two front/rear positions which are separated from each other along a transport direction of the recording material 3.

In this structure, an intermediate portion of the recording material 3 is not fixed, and thus, an wobble may easily occur due to vibrations applied to the conventional image recording apparatus 1. Accordingly, there is a risk that exposure precision is deteriorated by the vibrations.

As a consequence, the laser exposing unit 11 is generally disposed at a lower portion of the image recording apparatus 1, where is hardly influenced by the vibrations.

Also, the heat development unit 15 is disposed at the uppermost portion of the image recording apparatus 1 in order that exhausted gas and heat, which are produced when heating process operation is performed, can be hardly close within this image forming apparatus 1. Thus, air and heat are exhausted from heat/air-exhausting slits (not shown) arranged at the upper portion of the image recording apparatus 1.

As a result of determining the arrangements of both the laser exposing unit 11 and the heat development unit 15, the mounting trays 5 and 6 are disposed in the intermediate portion of the image recording apparatus 1. Otherwise, in view of the user operability when the recording materials 3 are mounted on the mounting trays 5 and 6, the mounting trays 5 and 6 are disposed in the intermediate portion.

The transporting mechanism 17 has deriving means 31, first transporting means 32, second transporting means 34a, 34b, 34c, and third transporting means 38a, 38b. The deriving means 31 draws out the recording materials 3 from the respective mounting trays 5 and 6 one sheet by one sheet. The first transporting means 32 transports the recording materials 3 drawn out from the mounting trays 5 and 6 to the laser exposing unit 11. The second transporting means 34a, 34b, and 34c transport the recording materials 3 which have been carried out the exposure process from the laser exposing unit 11 to the heat development unit 15. The third transporting means 38a and 38b eject the recording materials 3 to which the developing process have been completed onto an ejection tray 36.

As mentioned above, the laser exposing unit 11 and the heat development unit 15 are separated from each other along upper/lower directions while sandwiching the mounting trays 5 and 6 arranged in the intermediate layout portion of the conventional image recording apparatus 1. Therefore, the transporting mechanism 17 employs such a transporting system that transports the recording material 3 to the laser exposing unit 11 at the lower portion in order to expose the laser on the recording material 3, and then transports to the heat development unit 15 at the upper portion. Therefore, the length of the transport path for the recording material 3 is made longer, so that the processing time is prolonged.

SUMMARY OF THE INVENTION

An object of the invention is to provide an image recording apparatus with the dry system, which enables to reduce a length of a transport path for a recording material within the image recording apparatus so as to shorten processing time.

The invention provides an image recording apparatus has a mounting tray for storing therein a sheet-shaped recording material to be recorded an image; a laser exposing unit for forming an image on the recording material by laser irradiation; a heat development unit for heat-developing the recording material on which an image is formed; and a transporting unit for transporting the recording material drawn on from the mounting tray to the heat development unit via the laser exposing unit, wherein both the laser exposing unit and the heat development unit are disposed at an position where is either upper or lower than the mounting tray.

According to the configuration, since the laser exposing unit and the heat development unit are disposed at the same positions along either the upper direction or the lower direction with respect to the mounting tray, the transporting unit for transporting the recording material within the image recording apparatus no longer requires such a redundant transport path through which the recording material is fed back.

As a consequence, the length of the transport path for the recording material within the image recording apparatus can be shortened to the minimum path length to shorten the processing time.

Moreover, the image recording apparatus further has a supporting unit for supporting the recording material in a predetermined attitude during the laser irradiation by the laser exposing unit.

According to the configuration, since the vibration-proof characteristic of the supporting unit for supporting the recording material is increased, the restriction as to the conventional layout can be released where the laser exposing unit is arranged at the lower portion of the conventional image recording apparatus, which can be hardly adversely influenced by the vibrations. The design freedom with respect to the transport path for the recording material within the image recording apparatus can be enlarged.

Furthermore, the supporting unit has a supporting plate for supporting the recording material by making plane-contact with a rear plane of the recording material; and depressing means, which is located to face the supporting plate, for depressing the recording material against the supporting plate.

According to the configuration, although the supporting mechanism is constructed of the relatively simple components, this supporting mechanism can support the entire surface of the recording material under steady condition. It can firmly avoid that the vibrations occur in the intermediate portion and the like of the recording material due to the vibrations propagated through this image recording apparatus.

Furthermore, both said laser exposing unit and said heat development unit are disposed at the position where is upper than said mounting tray. Furthermore, said mounting tray, said laser exposing unit, and said heat development unit are disposed in this order from a lower side to a upper side of the image recording apparatus. Therefore, it is suitable so as to secure the air exhausting/heat exhausting characteristics.

DETAILED DESCRIPTION OF THE PREFERRED EMBODIMENTS

Figure 1:
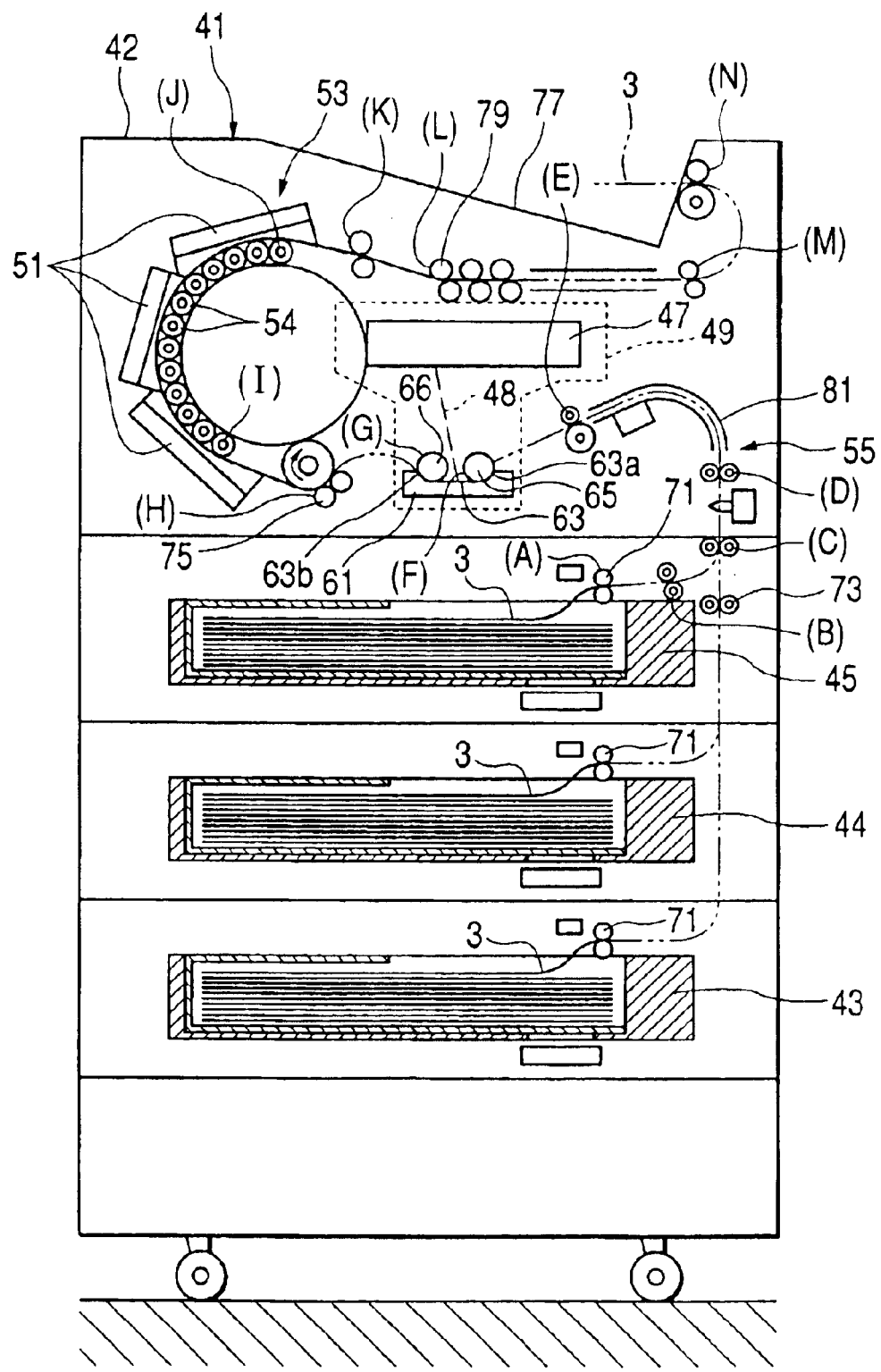
FIG. 1 is a cross-sectional view for schematically showing a structure of an image recording apparatus according to an embodiment of the present invention.

Referring now to the drawings, an image recording apparatus 41 according to an embodiment of the present invention will be described in detail.

FIG. 1 is a cross-sectional view showing a arrangement of the image recording apparatus 41 according to one embodiment of the present invention.

An image recording apparatus 41 of this embodiment uses the dry system which can record clear black-colored images having both high resolution and sharpness suitable for a medical diagnostic purpose. The image recording apparatus 41 has mounting trays 43, 44, 45, a laser exposing unit 49, a heat development unit 53, and a transporting mechanism 55 in a housing 42. The mounting trays 43, 44, and 45 store therein sheet-shaped recording materials 3 which are used to record thereon images and are made of heat (thermal) developing/photosensitive materials having a photosensitive characteristic and a thermo-sensitive characteristic. The laser exposing unit 49 forms latent images of images on the recording materials 3 with an exposure process by laser irradiation 48 from a laser exposing unit 47. The heat development unit 53 performs a heat development process for the exposure-processed recording materials 3 by heating means 51. The transport mechanism 55 transports the recording materials 3 drawn out from the mounting trays 43, 44, and 45 to the heat development unit 53 via the laser exposing unit 49.

The laser exposing unit 49 includes a supporting mechanism 61 which supports the recording materials 3 in a predetermined steady attitude while exposure process is performed. The supporting mechanism 61 has a supporting plate 63 and depressing rollers 65, 66. The supporting plate 63 supports the recording materials 3 by making plane-contact with a rear surface of the recording materials 3. The depressing rollers 65 and 66 serve as depressing means which are located to face the supporting plate 63, and depress the recording material 3 against the supporting plate (guide plate) 63.

The depressing rollers 65 and 66 are equipped along the transport direction of the recording materials 3 and are separated from each other. Since the depressing rollers 65 and 66 are driven by a rotary driving means (not shown), they may also transport the recording materials 3 into/from the laser exposing unit 49 as a functional portion of the transporting mechanism 55.

As a supplementary explanation, a front edge 63a and a rear edge 63b of the supporting plate 63 are tapered so as to bend both a front edge and a rear edge of a recording material 3 to be supported by this supporting plate 63 at proper angles on the side of the depressing rollers 65 and 66. Since this edge bending effect made by the tapered edges may cause the recording material 3 to be curved in a concave shape along an upper direction, vibrations along upper/lower directions can be hardly produced in an intermediate portion of this recording material 3.

As explained in this embodiment, although the supporting structure using the supporting plate 63 is constructed of relatively simple components, this supporting structure can support the entire surface of the recording material 3 under steady condition, and thus, can avoid that the wobbling occur in the intermediate portion and the like of the recording material 3 due to the vibrations propagated through the image recording apparatus 41.

As a result, even in such a case that the vibration-proof performance of the laser exposing unit 49 is improved and this laser exposing unit 49 is arranged in either the intermediate portion or the upper portion of the image recording apparatus 41, it is possible to avoid that the wobbling are produced in the intermediate portion of the sheet-shaped recording material 3 due to the adverse influence caused by the vibrations occurred in the image recording apparatus 41, and it is also possible to avoid that the exposure precision is deteriorated due to the vibration of the recording material 3, so that the image recording operation can be maintained in high precision.

The laser exposing unit 47 of the laser exposing section 49 irradiates laser light which has been modulated based upon image data to be recorded onto the surface of the recording material 3 in accordance with a predetermined scanning method in order to form a latent image on the recording material 3.

Since the supporting mechanism 61 having the superior vibration-proof characteristic is employed, the laser exposing unit 49 can be disposed in the intermediate portion or the upper portion of the image recording apparatus 41. As a result, the structure of the image recording apparatus 41 may be realized, in which the mounting trays 43, 44, and 45, the laser exposing unit 49, and the heat development unit 53 are disposed in this order from the lower portion to the upper portion of the image recording apparatus 41. In other words, both the laser exposing unit 49 and the heat development unit 53 are disposed at the position where is upper than the mounting trays 43, 44, and 45.

In this embodiment, the heating means 51 of the heat development unit 53 is formed in the plate shape, and is arranged on the outer circumferential side of a transporting roller 54. The transporting roller 54 transports the recording material 3 along a peripheral portion of a cylindrical drum. Another heating means heating the recording material 3 from an inner side of this recording material 3 transported over the circumference may be alternatively employed as the heating means 51.

The transporting mechanism 55 has a deriving means 71, a first transporting means 73, a second transporting means 75, and a third transporting means 79. The deriving means 71 draws out the respective recording materials 3 from the respective mounting trays 43, 44, 45 one sheet by one sheet in response to an instruction issued from a control circuit (not shown). The first transporting means 73 transports the recording material 3 drawn out by the deriving means 71 to the laser exposing unit 49. The second transporting means 75 transports the recording material 3 exposed by the laser exposing unit 49 to the heat development unit 53. The third transporting means 79 ejects the recorded recording material 3 heat developed by the heat development unit 53 to an ejecting unit 77.

Each of the transporting means 73, 75, and 76 owns such a mechanism that one or both paired rollers for sandwiching the recording material 3 is rotated to transport the sandwiched recording material 3. Each of these transporting means 73, 75, and 79 may be equipped with a guide for defining (correctly positioning) a position of a recording material 3, if necessary.

For instance, a guide 81 equipped on the first transporting means 73 correctly defines an approaching angle of the recording material 3 into the laser exposing unit 49, and also correctly defines position of side edges of the recording material 3.

In accordance with the above-described image recording apparatus 41, the mounting trays 43, 44, 45, the laser exposing unit 49, and the heat development unit 53 are disposed along the upper/lower directions in accordance with the processing sequence in which the various process are performed for the recording materials 3 drawn out from the mounting trays 43, 44, and 45. As a consequence, the transporting mechanism 55 for transporting the recording materials 3 within the image recording apparatus 41 no longer requires such a redundant transport path through which the recording materials 3 are fed back.

Therefore, the length of the transport path for the recording materials 3 can be shortened to the minimum path length to shorten the processing time.

Figure 2:
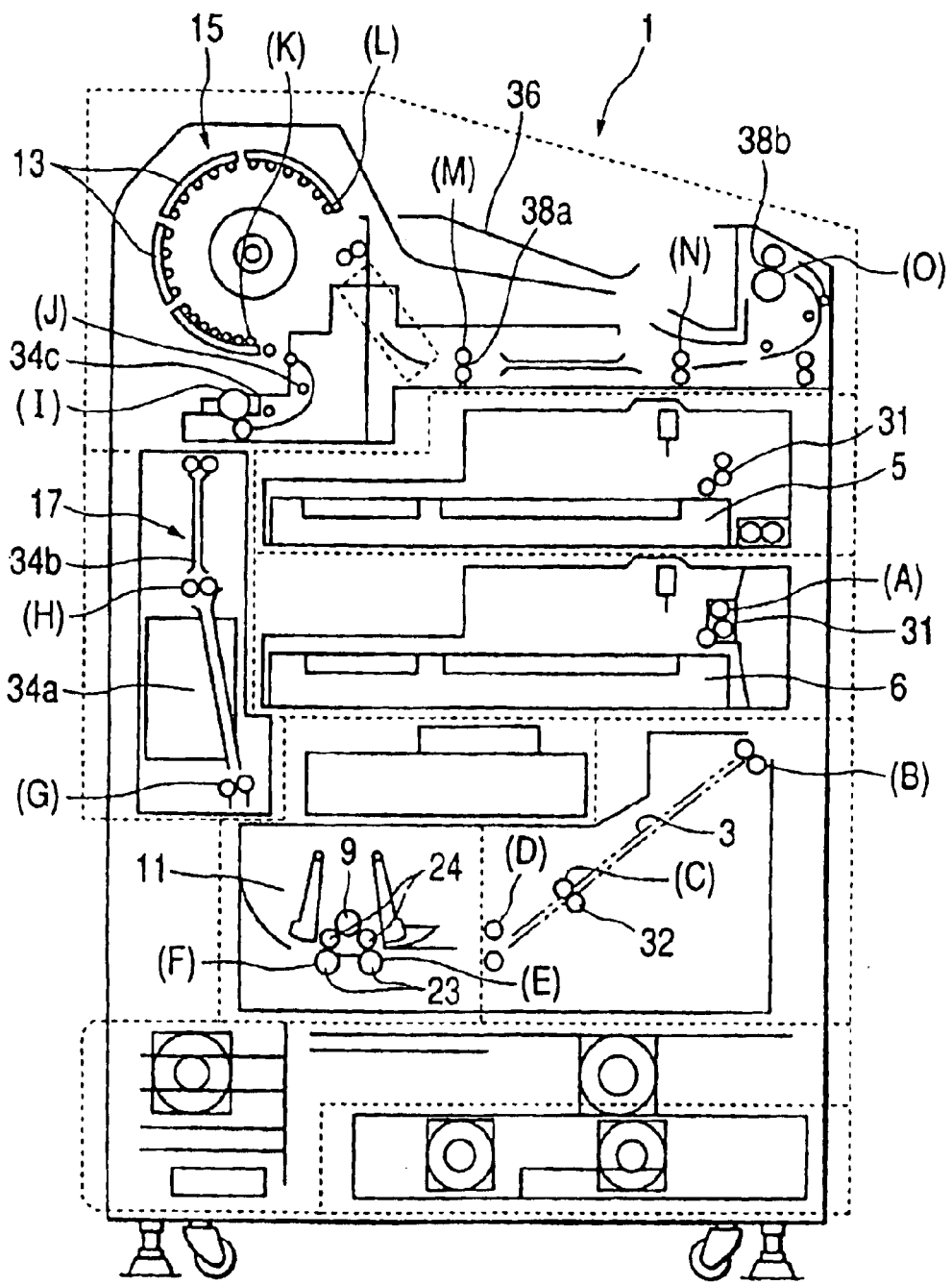
FIG. 2 is a cross-sectional view for schematically indicating the structure of the conventional image recording apparatus.

Incidentally, the Inventors of the present invention measured the lengths of the transport paths as to the image recording apparatus 41 (shown in FIG. 1) according to the present embodiment and the presently-available image recording apparatus 1 (shown in FIG. 2) in order to concretely indicate a difference between the image recording apparatus 41 and the presently-available image recording apparatus 41. It should be noted that as to the transport path lengths, minimum lengths were measured which are defined from mounting trays until recording materials are ejected outside the relevant image recording apparatus 41, or 1. It should also be noted that alphabetical symbols represent the respective measuring sections in FIG. 1 and FIG. 2.

In both the image recording apparatus 41 of the present embodiment and the conventional image recording apparatus 1, transport path lengths, film transport speeds, and passing time required for the respective measuring sections were given as the below-mentioned tables 1 and 2:

TABLE 1

(The image recording apparatus 41)

| Section | Path Length (mm) | Speed (mm/s) | Time (second) |
| --- | --- | --- | --- |
| A–B | 35.5 | 200 | 0.18 |
| B–C | 86 | 200 | 0.43 |
| C–D | 88.5 | 200 | 0.44 |
| D–E | 250 | 200 | 1.25 |
| E–F | 77 | 28.93 | 2.66 |
| F–G | 46 | 28.93 | 1.59 |
| G–H | 138 | 28.93 | 4.77 |
| H–I | 48 | 28.93 | 1.66 |
| I–J | 380 | 28.93 | 13.14 |
| J–K | 28 | 28.93 | 0.97 |
| K–L | 216 | 28.93 | 7.47 |
| L–M | 196.5 | 28.93 | 6.79 |
| M–N | 137 | 200 | 0.69 |

(Total) Section (A to N): 1726.5 mm, Time: 42.04 seconds

TABLE 2

(The conventional image recording apparatus 1)

| Section | Path Length (mm) | Speed (mm/s) | Time (second) |
| --- | --- | --- | --- |
| A–B | 205 | 250 | 0.82 |
| B–C | 250 | 126 | 1.98 |
| C–D | 70 | 300 | 0.23 |
| D–E | 150 | 22.5 | 6.67 |
| E–F | 45 | 22.5 | 2.0 |
| F–G | 170 | 22.5 | 7.56 |
| G–H | 225 | 300 | 0.75 |
| H–I | 245 | 16.5 | 14.85 |
| I–J | 95 | 16.5 | 5.76 |
| J–K | 80 | 17.1 | 4.68 |
| K–L | 405 | 17.1 | 23.68 |
| L–M | 22.0 | 17.1 | 1.29 |
| M–N | 238 | 17.1 | 13.92 |
| N–O | 180 | 17.1 | 10.53 |

(Total) Section (A to O): 2578 mm, Time: 94.72 seconds

As apparent from the above-described measurement results, in accordance with the image recording apparatus 41 of this embodiment, the following facts could be confirmed. That is, the transport path length could be reduced from 2578 mm to 1726.5 mm, and the processing time could be shortened from 94.72 seconds to 42.04 seconds, as compared with the conventional image recording apparatus 1.

Also, although the supporting mechanism 61 for supporting the above-described recording material 3 is constructed of the relatively simple components, this supporting mechanism 61 can support the entire surface of the recording material 3 under stable/fixed conditions, and thus, can avoid that the wobbling occur in the intermediate portion and the like of the recording material 3 due to the vibrations propagated through the image recording apparatus 41.

As a result, even in such a case that the vibration-proof performance of the laser exposing unit 49 is improved and this laser exposing unit 49 is disposed in either the intermediate portion or the upper portion of the image recording apparatus 41, it is possible to avoid that the vibrations are produced in the intermediate portion of the recording material 3 due to the adverse influence caused by the vibrations occurred in the image recording apparatus 41, and therefore, it is also possible to avoid that the exposure precision is deteriorated due to the vibrations of the recording material 3, so that the image recording operation can be maintained in high precision.

In the above-described embodiment, the mounting trays, the laser exposing unit, and the heat development unit were disposed in this order from the lower side of the image recording apparatus 41. As a result, the heat development unit could be maintained set to the upper portion of this image forming apparatus 41, so that it is suitable so as to secure the air exhausting/heat exhausting characteristics. The mounting trays, the laser exposing unit, and the heat development unit may be alternatively arranged in this order from the upper side of the image recording apparatus. In this alternative case, since the heat development unit is positioned at the lowermost stage of this image recording apparatus, for example, in order to avoid that heat generated from the heat development unit rises within the housing of the image recording apparatus and then is close within this housing, a heat exhausting fan, or the like, may be equipped at the setting position of this heat development unit. The heat exhausting fan may forcibly exhaust remaining heat in a higher efficiency.

What is claimed is:

1. An image recording apparatus comprising:
   a mounting tray storing a sheet-shaped recording material;
   a laser exposing unit forming an image on said recording material by laser irradiation;
   a heat development unit using heat to develop the recording material on which an image is formed; and
   a transporting unit for transporting said recording material drawn out from said mounting tray to said heat development unit via said laser exposing unit,
   wherein said laser exposing unit and said heat development unit are positioned adjacent to each other on a horizontal plane at a position where said mounting tray is below the laser exposing unit and the heat development unit or where said mounting tray is above the laser exposing unit and the heat development unit.

2. The image recording apparatus according to claim 1, further comprising a supporting unit supporting said recording material in a predetermined attitude during the laser irradiation by said laser exposing unit.

3. The image recording apparatus according to claim 2, wherein said supporting unit comprises:
   a supporting plate supporting the recording material by making plane-contact with a rear plane of said recording material; and
   depressing means, located to face said supporting plate, depressing said recording material against said supporting plate.

4. The image recording apparatus according to claim 1, wherein transporting path created by the transporting unit is about 1700 mm.

5. The image recording apparatus according to claim 1, wherein processing time of the image recording apparatus is about 42 seconds.

6. The image recording apparatus according to claim 1, wherein the supporting unit supports entire surface of the recording material.

7. An image recording apparatus comprising:
   a mounting tray storing a sheet-shaped recording material;
   a laser exposing unit forming an image on said recording material by irradiation;
   a heat development unit using heat to develop the recording material on which an image is formed;
   a transporting unit for transporting said recording material drawn out from said mounting tray to said heat development unit via said laser exposing unit;
   a supporting plate supporting the recording material in the laser exposing unit; and
   two depressing rollers depressing the recording material, pressing the recording material against the supporting plate in the laser exposing unit,
   wherein said mounting tray is below the laser exposing unit and the heat development unit and wherein the supporting plate has a front and rear edges tapered bending front and rear edges of the recording material.

8. The image recording apparatus according to claim 7, wherein said tapered edges of the supporting plate curve the recording material in a concave shape preventing vibration in an intermediate portion of the recording material.

* * * * *